United States Patent
Dobler et al.

(10) Patent No.: US 6,361,291 B1
(45) Date of Patent: Mar. 26, 2002

(54) FUEL DELIVERY SYSTEM

(75) Inventors: Klaus Dobler; Michael Huebel, both of Gerlingen; Willi Strohl, Beilstein, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,865

(22) PCT Filed: May 5, 1999

(86) PCT No.: PCT/DE99/01342

§ 371 Date: Apr. 3, 2000

§ 102(e) Date: Apr. 3, 2000

(87) PCT Pub. No.: WO99/63644

PCT Pub. Date: Dec. 9, 1999

(30) Foreign Application Priority Data

May 29, 1998  (DE) .......................................... 198 24 135

(51) Int. Cl.⁷ .......................... F04B 17/00; F04B 35/04; H02K 17/16; H02K 17/18; H02K 9/00
(52) U.S. Cl. ..................... 417/356; 417/423.7; 310/211; 310/212; 310/62
(58) Field of Search ............................. 417/423.2, 356; 310/211, 212, 62, 87, 63

(56) References Cited

U.S. PATENT DOCUMENTS

| | | | | |
|---|---|---|---|---|
| 1,771,936 A | * | 7/1930 | Morrill | 310/212 |
| 1,986,368 A | * | 1/1935 | Schwarz | 172/120 |
| 2,242,006 A | * | 5/1941 | Leader | 172/120 |
| 3,708,251 A | * | 1/1973 | Pierro | 417/356 |
| 3,938,913 A | * | 2/1976 | Isenberg et al. | 417/356 |
| 4,425,539 A | * | 1/1984 | Wills | 318/771 |
| 4,852,434 A | * | 8/1989 | Bald | 82/118 |
| 5,474,429 A | * | 12/1995 | Heidelberg et al. | 417/356 |
| 5,545,017 A | * | 8/1996 | Strohl et al. | 417/423.7 |
| 6,149,404 A | * | 11/2000 | Dobler et al. | 417/356 |
| 6,179,579 B1 | * | 1/2001 | Dobler et al. | 417/356 |

FOREIGN PATENT DOCUMENTS

WO 95/25885 9/1995

* cited by examiner

Primary Examiner—Charles G. Freay
Assistant Examiner—Timothy P. Solak
(74) Attorney, Agent, or Firm—Michael J. Striker

(57) ABSTRACT

The invention relates to a fuel delivery unit, having a side channel pump that in a housing (13) has a pump chamber (14) and in the pump chamber (14) has an impeller (16), and having an electric motor (12) that drives the impeller (16) and has a stator and a rotor (29). The impeller (16) of the fuel delivery unit is the rotor (29) of an asynchronous motor. The electric motor (12) can be assembled from only a few, highly reliable and strong components.

11 Claims, 4 Drawing Sheets

FUEL DELIVERY SYSTEM

PRIOR ART

The invention relates to a delivery unit for fuel having a side channel pump in a housing having a pump chamber and an impeller included in the pump chamber.

In a known delivery unit of this type for delivering fuel from a fuel tank to an internal combustion engine of a motor vehicle (International Patent Disclosure W 095/25885), the feed pump and electric motor for driving it are disposed side-by-side in a housing. The pump wheel or impeller, which is equipped with vanes or impeller blades on its circumference, is seated in a manner fixed against relative rotation on a shaft of the rotor or impeller, which has a rotor or armature winding placed in slots and which revolves in a stator equipped with permanent magnet segments. The supply of current to the armature winding is effected via a commutator or current inverter seated on the rotor shaft and two current brushes resting radially with spring pressure on the commutator.

ADVANTAGES OF THE INVENTION

The delivery unit for fuel according to the invention has the advantage that by combining the rotating parts of the delivery unit, that is, the impeller of the feed pump and rotor of the electric motor, into a single part, a very simple compact construction that can be made at little production cost. In particular, the delivery unit can be quite flat, or in other words can have an extremely small axial dimension. The outer diameter of the delivery unit that is accordingly larger is not only no disadvantage in conjunction with the usual embodiment of the delivery unit but in fact opens up the possibility of additional provisions for improving the efficiency of the delivery unit. By eliminating the commutator and current brushes, brush wear is not a factor, and the service life of the delivery unit is accordingly increased. If the electric motor is embodied as a DC motor, the necessary commutation of the current is done electronically in the stator winding.

In accordance with a preferred embodiment of the invention, the cylindrical pump chamber is defined by two radially extending, axially spaced-apart side walls and a peripheral wall joining the two side walls together along their circular periphery. The impeller faces the side walls with gap clearance, and the inside face of the stator, formed by a slotted lamination packet, forms the peripheral wall of the pump chamber. The impeller has many radial impeller blades, spaced circumferentially apart from one another and between them defining axially open blade chambers; the blades are joined together by an outer ring. The permanent magnets are secured to the outer ring and are preferably made of plastoferrites, if the delivery unit is made of plastic.

As an alternative to this, plastic-bonded rare-earth magnets can be used that are preferably embedded in the plastic matrix of the impeller.

In an advantageous embodiment of the invention, a slot-like side wall open toward the pump chamber is embodied in each side wall of the pump chamber, concentrically to the impeller axis, with an interrupting rib remaining between the end and the beginning of the side channel in terms of the flow direction. The beginning of at least one side channel communicates with an intake opening, and the end of the side channel communicates with a pressure outlet; the axes of the inflow and outflow channels are oriented either axially or preferably radially from the intake opening and to the pressure outlet. Because of the especially advantageous radial inflow and outflow of fuel into and out of the pump chamber, a substantial reduction in flow losses is attained, and the pump efficiency is thus improved. The radial oncoming and outgoing flow, in contrast to conventional side channel pumps, is possible without difficulty because of the increased diameter of the delivery unit attained by the construction according to the invention, since as a result there is enough installation space in the radial direction to accommodate suitable inflow and outflow channels.

BRIEF DESCRIPTION OF THE DRAWING

The invention is described in further detail in the ensuing description in terms of an exemplary embodiment shown in the drawing. The drawings schematically show.

DESCRIPTION OF THE EXEMPLARY EMBODIMENTS

Figure 1:
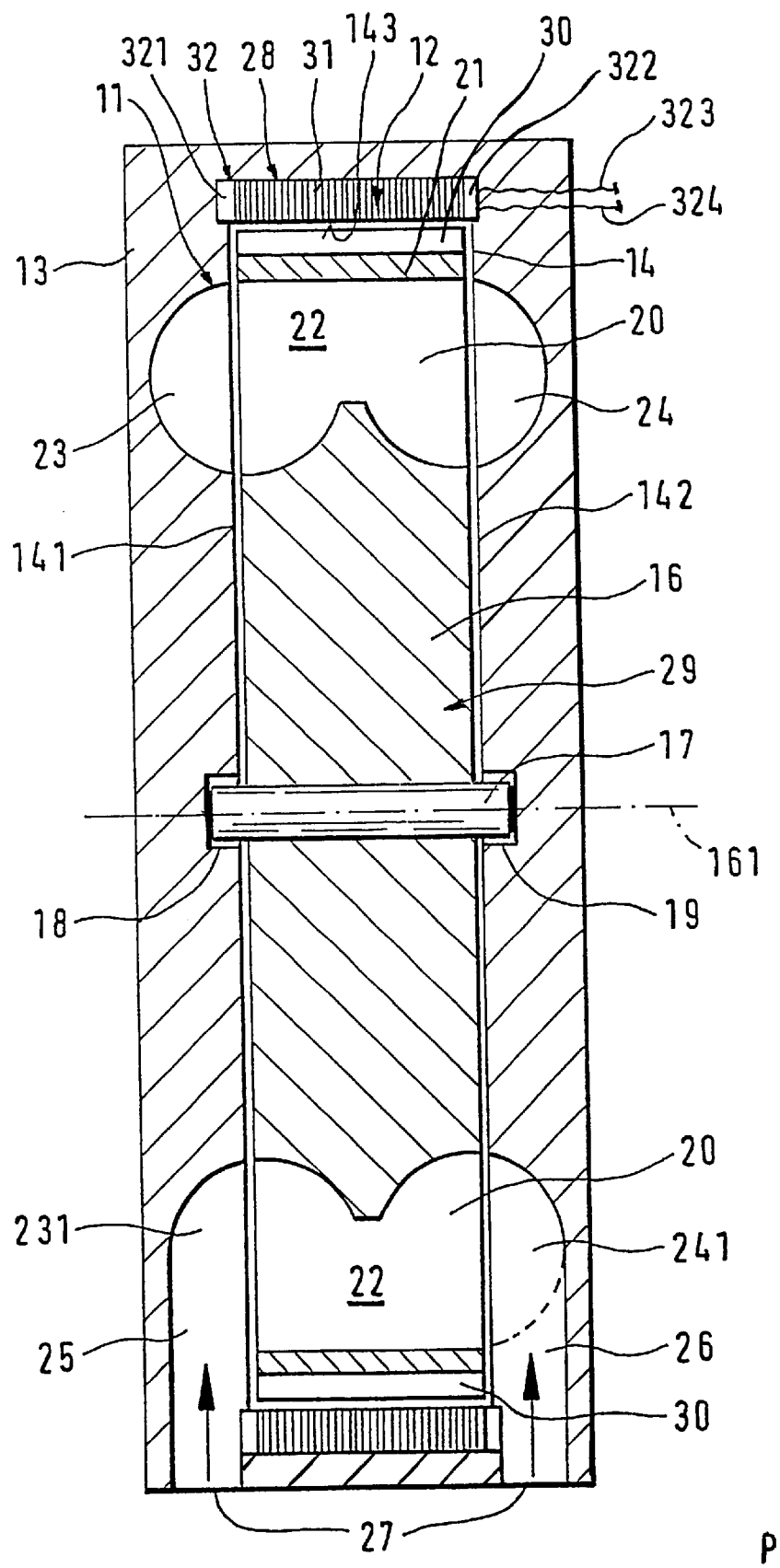
FIG. 1, a longitudinal or meridial section of the delivery unit, with the section in the upper half taken through the flow region formed and in the lower half through the intake region of the delivery unit.

The delivery unit schematically shown in FIG. 1 is used to feed fuel from a supply container to the internal combustion engine of a motor vehicle. Typically, the delivery unit in combination with a filter pod is disposed as a so-called built-in tank unit in the fuel container or tank of the motor vehicle. The delivery unit has a feed pump 11, embodied as a flow pump or side channel pump, and an electric motor 12 that drives the feed pump 11. The feed pump 1 and electric motor 12 are received in a common housing 13. The layout and mode of operation of the feed pump 11 are known and are described for instance in German Patent Disclosure DE 40 20 521 A1. A pump chamber 14 is embodied in the housing 13 and is defined in the axial direction by two radially extending, axially spaced-apart side walls 141,142 and in the circumferential direction by a peripheral wall 143 joining the two side walls 141, 142 together along their circular periphery. A pump wheel or impeller 16 is disposed in the pump chamber 14 and is seated on a shaft 17 in a manner fixed against relative rotation. The shaft 17 is received by both ends in two bearings 18,19, which are embodied in the two side walls 141, 142. The axis of the shaft 17 is colinear with the impeller axis 161 and the axis of the pump chamber 14. The impeller 16 has many radial impeller blades 20, spaced-apart circumferentially from one another, only two of which can be seen in the drawings. The impeller blades 20 are joined together by an outer ring 21. Each two impeller blades 20 between them define a blade chamber 22 that is axially open. The impeller 16 faces the side walls 141,142 with gap clearance, and the outer ring 21 forms a radial gap with the peripheral wall 143 of the pump chamber 14. In each side wall 141,142 of the pump chamber 14, one slot-like side channel 23 and 24, respectively, is formed, which is open toward the pump chamber 14 and disposed concentrically with the impeller axis 161, and in the circumferential direction, over nearly 333 degrees from a beginning of a side channel, an interrupting rib remains. In the drawing, in the lower sectional view, only the beginnings 231 and 241 of the side channels 23, 24 can be seen. The end of the side channel is offset by comparison by a circumferential angle of approximately 330 degrees. Each side channel 23, 24 communicates via a radially oriented inflow channel 25 and 26, respectively, with an intake opening 27 of the delivery unit. The ends, not visible here, of the two side channels 23, 24 each communicate via a respective outflow channel with a pressure connection of the delivery unit. In an alternative version of the invention, only the beginning 231 of the side channel 23 communicates with an inflow channel 25, and only the end of the side channel 24 communicates with an outflow channel. In that case, the inflow channel 26 on the right in the sectional view is omitted, and the side channel 24 in this region has a cross-section as indicated by dashed lines in the drawing. Furthermore, the inflow channels 25, 26 can be disposed axially instead, but the radial orientation has the advantage of lesser flow losses and can also be easily realized because of the relatively large outside diameter of the delivery unit.

The electric motor 12, embodied with a so-called innerpull rotor, has a stator 28 and a rotor 29 in a known manner; to attain an extremely flat construction of the delivery unit, the rotor is integrated with the impeller 16 of the feed pump 11. Its magnet poles are formed by permanent magnet segments 30, which are secured to the outer ring 21 of the impeller 16. To achieve a favorable magnetic return, the outer ring 21 is preferably made of servo-magnetic material. The stator 28, as a slotted lamination packet 31, is disposed coaxially to the impeller axis 161 in the housing 13 in such a way that the inner ring surface of the lamination packet 31 forms the peripheral wall 143 of the pump chamber 14. An armature winding 32 is typically disposed in the slots of the lamination packet 31; of this winding, only the two winding heads 321 and 322 on the face ends and the two connecting lines 323 and 324 can be seen in the schematic drawing. In the case of DC-operation, the electric motor 12 is commutated electronically.

If the impeller 16 of the feed pump 11 is made of plastic, it is advantageous from a production standpoint if the permanent magnet segments 30 are made of plastoferrites or are plastic-bonded rare-earth magnets.

Figure 2:
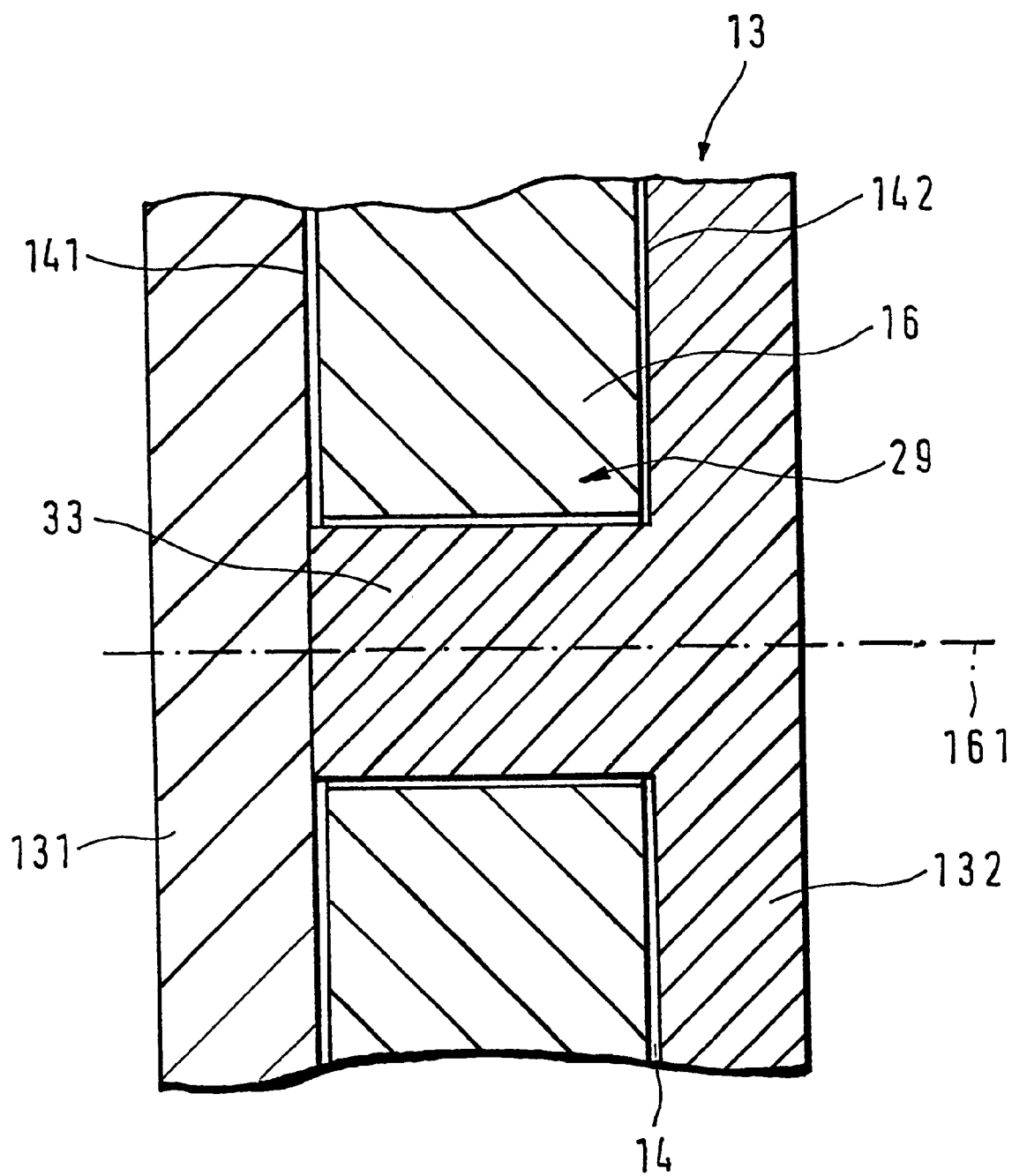
FIG. 2, a fragmentary view as in FIG. 1 of a modified delivery unit.

The further exemplary embodiment of the delivery unit, shown in fragmentary section in FIG. 2, is modified only in terms of the bearing of the impeller 16 in the housing 13 and otherwise matches the above-described exemplary embodiment, and thus identical components are identified by the same reference numerals. The side walls 141 and 142, respectively, of the pump chamber 14 are formed here by a cap 131 that closes off the housing 13 on the face end and by a radial flange 132 disposed in the housing 13. A shaft journal 33 protruding at right angles into the pump chamber 14 is embodied integrally with the housing flange 132, and the impeller 16 is supported, rotating freely, on this journal. Once the impeller 16 has been inserted, the cap 131 is placed tightly on the housing 13 and solidly joined to it.

Figure 3:
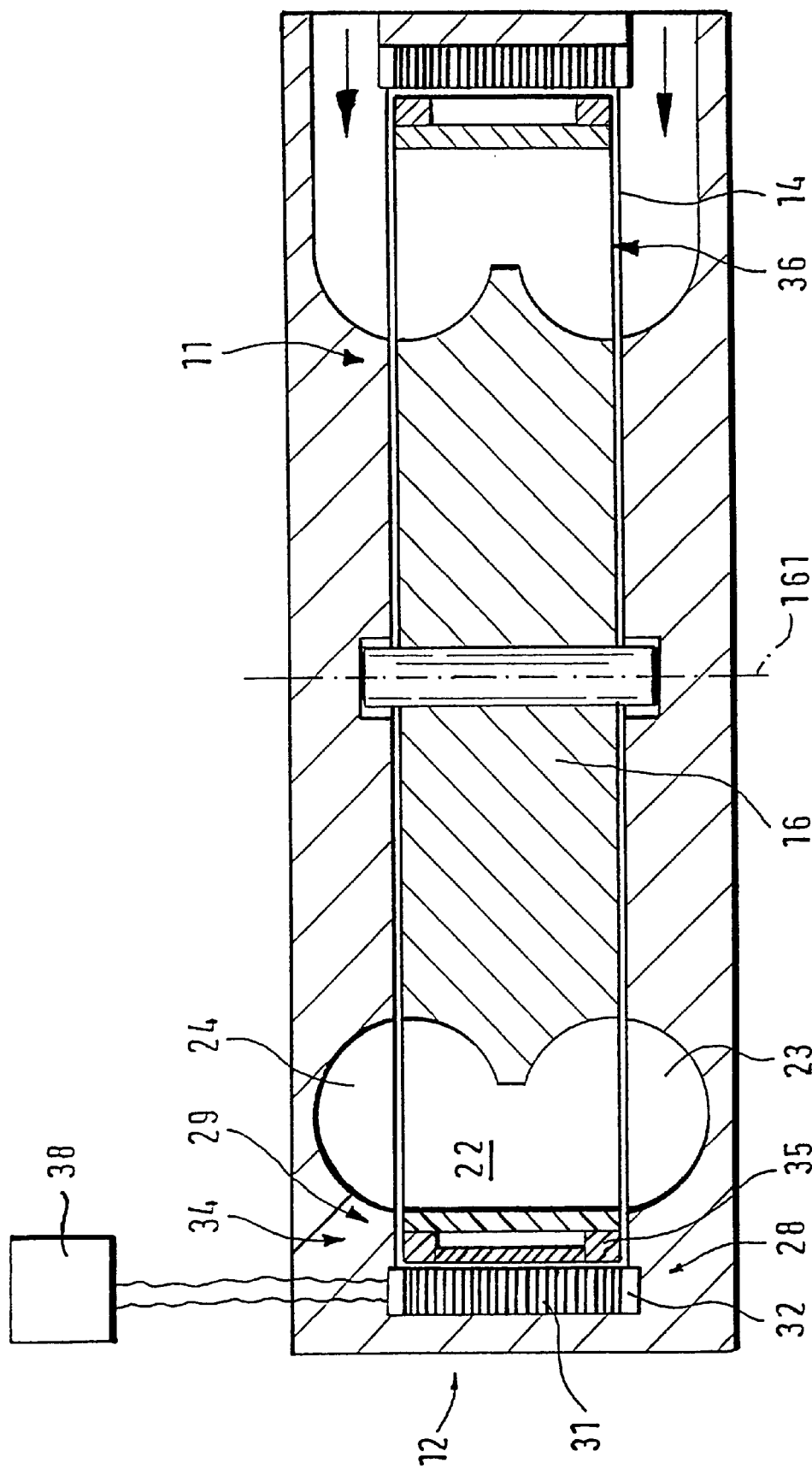
FIG. 3, a further preferred example, in which the electric motor is an asynchronous motor.

FIG. 3 shows a further preferred exemplary embodiment, in which the electric motor 12 is an asynchronous motor 34, in particular a three-phase current asynchronous motor. While the stator 28, for example as already seen in FIG. 1, with a lamination packet 31 and an armature winding 32 forms the stator 28, in FIG. 3 the rotor 29 of the asynchronous motor 34 is the impeller 16. The rotor 29 is a short-circuit rotor. This short-circuit rotor has a rotor cage 35. The rotor cage 35 of the short-circuit rotor is preferably of copper, bronze or aluminum. These materials have favorable electromagnetic properties as well as good properties in terms of production and strength. To economize on production steps, the rotor cage is preferably made in one piece. The impeller 16 and the rotor cage 35 in turn form a unit. This makes it possible for instance to cast the impeller 16 and the rotor cage 35 in one piece. However, the impeller 16 and the rotor cage 35 can also each be made separately and then joined together to form a unit. This unit then preferably has a coating 36. The coating makes it possible to have a smooth closure of all the surfaces of the unit formed by the impeller 16 and the rotor cage 35. This minimizes gap losses in the pump chamber 14 of the feed pump 11. The coating 36 is made for instance by immersion in a suitable bath. Another method is extrusion-coating of the unit comprising the impeller 16 and the rotor cage 35.

The embodiment shown in FIG. 3 makes a simplified and very cost-effective production of the pump wheel 16 possible. On the one hand, in principle, no permanent magnets are needed. On the other, the use of the rotor cage 35 prevents wear and high production costs. The electric motor 12 can also be assembled from only a few, highly reliable and strong components.

As shown in FIG. 3, the rotor cage 35 is disposed on the outer circumference 37 of the impeller 16. In another version, not shown in detail here, the rotor cage 35 is offset farther inward relative to the impeller axis 161, but without impairing the side channels 23, 24 or blade chambers 22. This somewhat farther inward-offset disposition of the rotor cage 35 is advantageous for instance if the unit comprising the rotor cage 35 and the impeller 16 is assembled from multiple parts. The short-circuit rotor expediently has a star-delta switchover 38. In operation of the electric motor 12, the electric motor runs in a delta circuit. For the startup of the electric motor 12, the motor is started in a star connection. As a result, the startup current, which amounts to a multiple of the rated current, can be reduced by using fractional voltages. As a result, the requisite torque for starting up the electric motor 12 is also, like the startup current, reduced to approximately one-third as a function of the square of the voltage.

Figure 4:
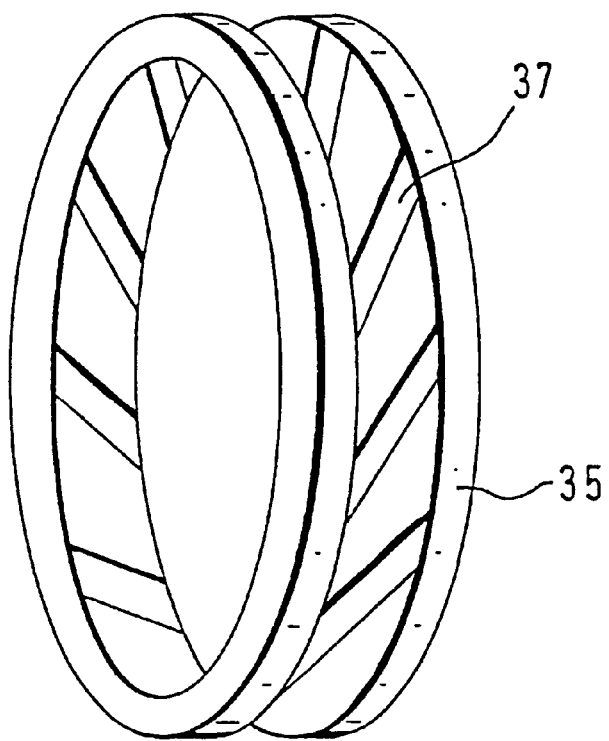
FIG. 4, a rotor cage of the asynchronous motor with obliquely extending slots.

FIG. 4 shows the rotor cage 35 with obliquely extending slots 39. The oblique position has the advantage of suppressing electromagnetic harmonics. Another advantage of using a short-circuit rotor for the electric motor is that the latter does not have an unambiguous number of pull pairs. The rotor cage 35 can therefore be inserted into different electric motors with different numbers of pull pairs in the stator, which supports a modular system for different feed pumps.

Figures 5, 6, 7:
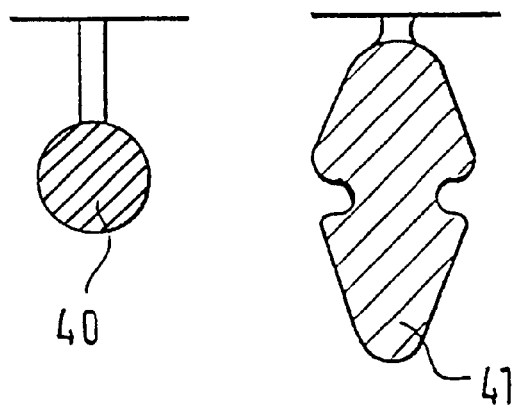
FIGS. 5, 6 and 7, different bars that can be used for the rotor cage.

FIG. 5, FIG. 6, and FIG. 7 show a variety of rods or bars which comprise the rotor cage and which are preferably used in the asynchronous motor. By way of the shape of the rotor rods and the rotor slots, the characteristic curves for the torque and the stator current can be varied greatly. For the feed pump, round bars 40, double bars 41 that belong together, and double bars 42 that are separate from one another have proved to be especially advantageous. However, still other shapes and geometries of the rods can be selected.

What is claimed is:

1. A fuel delivery unit, having a side channel pump in a housing (13) having a pump chamber (14) and an impeller (16) in the pump chamber (14), said deliver unit comprising an electric motor (12) that drives the impeller (16) and has a stator (28) and a rotor (29), wherein the impeller (16) is the rotor (29) of an asynchronous motor and wherein a rotor cage (35) is disposed on an outer circumference (37) of the impeller (16), characterized in that the rotor cage (35) has obliquely extending slots (39).

2. The fuel delivery unit of claim 1, characterized in that the rotor (29) is a short-circuit rotor.

3. The fuel delivery unit of claim 1, characterized in that the short-circuit rotor has a rotor cage (35).

4. The fuel delivery unit of claim 3, characterized in that the rotor cage (35) of short-circuit rotor is of copper, bronze or aluminum.

5. The fuel delivery unit of claim 3, characterized in that the impeller (16) and the rotor cage (35) form a unit.

6. The fuel delivery unit of claim 5, characterized in that the impeller (16) and the rotor cage (35) are cast in one piece.

7. The fuel delivery unit of claim 5, characterized in that the impeller (16) and the rotor cage (35), as a unit, have a coating (36).

8. The fuel delivery unit of claim 7, characterized in that the unit (36) is extrusion-coated.

9. The fuel delivery unit of claim 3, characterized in that the rotor cage (35) has round bars (40).

10. The fuel delivery unit of claim 3, characterized in that the rotor cage (35) has double bars (41).

11. The fuel delivery unit of claim 1, characterized in that it is connected to a star-delta switchover (38).

* * * * *